United States Patent [19]

Frank, Jr.

[11] 4,147,446

[45] Apr. 3, 1979

[54] SPLIT BOLT CONNECTOR WITH INTERLACED GROOVES IN PRESSURE PAD

[75] Inventor: Walter J. Frank, Jr., Darien, Conn.

[73] Assignee: Burndy Corporation, Norwalk, Conn.

[21] Appl. No.: 907,649

[22] Filed: May 22, 1978

[51] Int. Cl.$^{2}$ .......................... B25G 3/36; E04G 7/00; F16B 7/04

[52] U.S. Cl. ...................................... 403/390; 403/373; 339/244 B; 339/95 R

[58] Field of Search ............... 403/390, 393, 396, 398, 403/294, 355, 358, 373, 279, 281; 24/135 L, 135 R, 263 DT; 339/244 B, 272 B, 249 B, 95 R

[56] References Cited

U.S. PATENT DOCUMENTS

| | | | |
|---|---|---|---|
| 1,419,741 | 6/1922 | Lee | 403/393 |
| 2,450,158 | 9/1948 | Pennell | 403/396 X |
| 2,830,353 | 4/1958 | Barlow | 403/396 X |
| 2,983,012 | 5/1961 | Madden | 403/393 |
| 3,129,995 | 4/1964 | Brown | 403/393 X |
| 3,325,776 | 6/1967 | Eppler | 403/390 X |

FOREIGN PATENT DOCUMENTS

| | | | |
|---|---|---|---|
| 2336268 | 2/1975 | Fed. Rep. of Germany | 403/294 |

*Primary Examiner*—Wayne L. Shedd
*Attorney, Agent, or Firm*—Howard S. Reiter

[57] ABSTRACT

This invention relates to electrical connectors, and in one embodiment comprises a "split bolt" type connector having a pressure pad member interposed between the bolt head and the nut, the conductor contacting surfaces of which are characterized by being V-shaped with alternating lands and grooves oriented substantially transverse to the axis of conductors residing therein; the land on one side of each receptacle surface being interlaced with lands on the other side of the receptacle surface.

10 Claims, 3 Drawing Figures

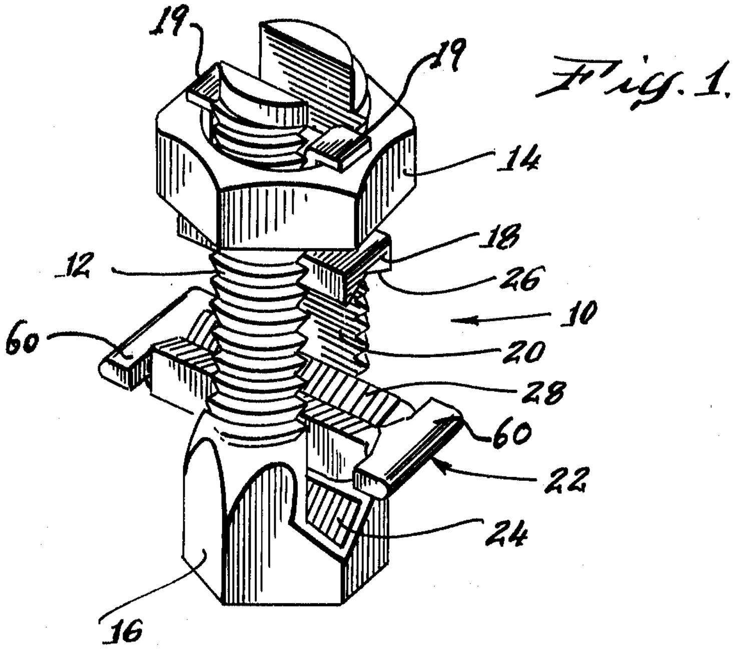
Fig. 1.
Fig. 2.
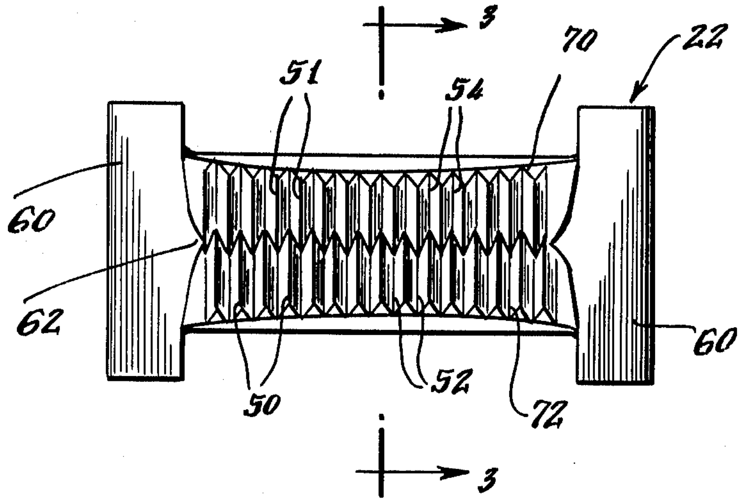
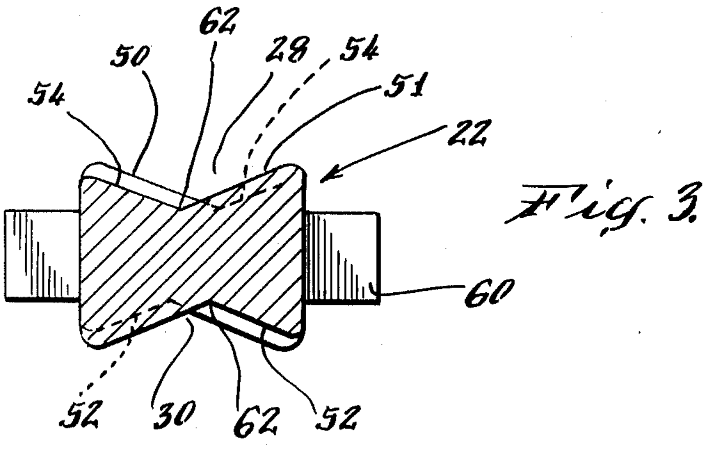
Fig. 3.

SPLIT BOLT CONNECTOR WITH INTERLACED GROOVES IN PRESSURE PAD

BACKGROUND OF THE INVENTION

So-called split-bolt connectors of various designs, useful, for example, for the tandem interconnection of conductor ends, are known per se. In this connection reference is made to U.S. Pat. Nos. 2,956,323; 3,298,072; and 2,830,353. With such devices, as well as with so-called U-bolt connectors (in which connection reference is made to U.S. Pat. No. 3,848,953), it is known to utilize a pressure pad member positioned between the bolt head and each associated nut. By this means, conductor ends may be positioned on either or both sides of the pad member; i.e., between it and the contact surfaces associated with the underside of the bolt head and/or the nut by which retention pressure on the conductor ends is affected through cooperative interaction with the bolt threads. It is known to incorporate longitudinally spaced and transversely extending ridges and/or grooves on conductor contacting surfaces in such devices, to promote positive interlock between the various constituent parts and the conductors to be accommodated. Typically, such surfaces may be round in cross-sectional configuration to provide a seat in which the conductors may rest, with the associated ridges and/or grooves being continuous and extending all the way across the groove, substantially normal to the longitudinal axis of the groove.

Such prior art devices have proved to be deficient in their ability to provide the highest degree of retention of a variety of conductor shapes and sizes, particularly as to conductors of relatively small diameter. A source of difficulty has been that when the "lands" or ridges are used which are continuous from one side of the groove to the other, localized high stress, with consequent "notching" across the region of contact between each such land and its associated conductor, can cause strength reductions and breakage proneness which is more severe with smaller-sized conductors.

Accordingly, it is an object of this invention to provide improved retention means for electrical connectors, particularly of the split bolt and U-bolt types.

Another object of this invention is to provide means for achieving the objectives herein set forth which is adapted for use with various conductors of various cross-sectional configurations and/or sizes; particularly a smaller diameter.

SUMMARY OF INVENTION

Desired objectives may be achieved through practice of the present invention one embodiment of which, useful in connection with split bolt or U-bolt type electrical connectors, comprises a pressure pad member positioned between the underside of the bolt head and the conductor contacting surface of the nut rider, having at least one conductor contact surface in the form of a linear concavity which preferably is generally V-shaped in cross-section, the walls of which have alternating lands and grooves, with the lands of each wall aligned with grooves of the other wall and the juxtaposed ends of the lands of each wall interleaved with those of the other wall. In other embodiments, conductor receptacles so configured may also or alternatively be included in the surface of the slot at the underside of the bolt-heads and/or at the surface of the associated nut-rider which faces toward the bolt head.

DESCRIPTION OF DRAWINGS

This invention may be understood from the description which follows and from the attached drawings in which FIG. 1 is a perspective view of a split bolt connector embodying the present invention, and FIG. 2 is a plan view of a pressure pad member embodying the present invention, and FIG. 3 is an end view of the pad member shown in FIG. 2.

DESCRIPTION OF PREFERRED EMBODIMENTS

Referring first to FIG. 1, there is depicted a split bolt connector 10, having a threaded shaft portion 12, an associated nut 14, and a head portion 16. Associated with the nut 14 is a nut rider 18 which is generally U-shaped, having the ends 19 of the legs of the "U" peened over after the rider has been inserted into the nut, whereby the nut is free to revolve around the rider 18 and the threaded shaft 12 while the rider remains stationary against rotation and is free to ride up and down within the slot 20 which extends the length of the shaft from one end of the base of the head 16. By this means, the nut 14 can be caused to migrate along the length of the shaft on rotation through interengagement and operation of the threads on the nut cooperatively with those on the shaft. It should be noted that the conductor contacting surface 26 of the nut rider 14 and the conductor contacting surface 24 at the base of the head 16 are both generally V-shaped in cross-section, and have lands and grooves, all in accordance with the description which follows in connection with the pressure pad 22.

The pressure pad 22 is interposed between the nut rider 18 and the base of the bolt head 16, being free to ride up and down within the slot 20, but being retained from falling out of the slot by the heads 60. It will be noted that the pressure pad 22 also has V-shaped conductor contacting surfaces (28, 30) facing respectively the nut rider 18 and the head 16. Thus, each pair of opposing, V-shaped conductor contact surfaces (26, 28, and 24, 30) form receptacles for electrical conductor ends, which may be simultaneously clamped shut so as to retain the conductor ends therebetween by turning the nut 14 in relation to the threaded shaft 12.

FIG. 2 is a plan view and FIG. 3 is an end view of the pressure pad member 22. As shown, it includes head 60. More particularly, these views illustrate the configuration of the lands and grooves included in the V-shaped conductor contact surfaces of the pad member 22. It will immediately be apparent that unlike the prior art devices where the lands and grooves were continuous from one edge of the conductor contact surface to the other, as shown in FIG. 2, this embodiment of this invention has the conductor contact surface divided into two substantially flat portions 70, 72 which join each other along the line 62 at the base of the groove, along which line the alternating lands 51 and grooves 52 of one side are interleaved with the lands 50 and the grooves 54 of the other side, so that the bottom end of each land 51 on one side is continuous with the groove 54 on the other side and the bottom end of each land 50 on one side is continuous with the groove 52 on the other side. It will also be noted that in the embodiment of this invention shown in FIGS. 1, 2, and 3 the lands of each side abut the grooves of the other side in a configuration which is generally V-shaped in cross-section. This feature is particularly advantageous insofar as it renders the connectors susceptible to accommodating a wide variety of cross-sectional configurations and diameters and conductors, especially if contrasted with structures wherein the cross-sectional configuration of the conductor contacting surfaces is a portion of the circle. Further, it will also be apparent that with such structures, it is possible to retain small conductors with substantially comparable pullout resistance capability to that attainable with large conductors, since such small conductors will seat themselves in the region of the join line 62. However, because of the interleaving feature of the ends of the lands, even with such small diameter conductors, the discontinuity of the retention grooves impressed in the conductor surface by the connector lands reduces the cross-sectional diameter reduction induced by deformation of the conductor at any given point along its length. Thus minimizing any tension strength reduction caused thereby.

In the embodiments hereinbefore described, the conductor contact surfaces have been described as being in two sets of cooperating pairs, in a split bolt electrical connector. This is illustrative of embodiments of the present invention but is not to be construed as to imply that this invention may be utilized only in this context. Thus, for example, it is within the contemplation of this invention that it may be utilized in devices other than electrical connectors, and in electrical connectors other than those of the type herein described and illustrated, and that it may comprise more than two sets of interleaved lands per surface, and may be embodied in one or more conductor contact surfaces, or in single pairs of conductor contact surfaces as well as multiple pairs and/or combinations of singles and pairs. Thus it is to be understood that the embodiments herein described and illustrated are by way of illustration and not of limitation, and that various other embodiments may be utilized without departing from the spirit or scope of this invention.

I claim:

1. In apparatus for effecting clamping retention of elongated objects, at least one object contacting surface characterized by the fact that said surface is in the form of an elongated concavity having more than one set of lands with grooves therebetween, said lands and said grooves being oriented substantially transverse to the longitudinal axis of said concavity, along which elongated objects are oriented when clampingly retained therein, the ends of the lands of one of said sets being aligned with the ends of the grooves in the other of said sets and in proximity to the ends of the lands in said other of said sets.

2. The surface described in claim 1 wherein the lands of said sets at their facing ends form an angle of less than 180 degrees.

3. The surface described in claim 2 wherein the tops of the lands of each of said sets describe a plane in the region of juxtaposition with the lands of the other of said sets.

4. The surface described in claim 3 wherein the planes are substantially flat.

5. The surface described in claim 3 or claim 4 wherein said angle is approximately 120 degrees.

6. A cable clamp comprising a split-bolt, a pressure pad member, and a nut with an associated nut rider wherein at least one among the surfaces comprising the end of this slot in said bolt next to the bolt head, the surface of said nut-rider facing said pad member, and the top and bottom of said pad member, is in the form of an elongated concavity having more than one set of lands with grooves therebetween, said lands and said grooves being oriented substantially transverse to the longitudinal axis of said concavity along which cables are oriented when clampingly retained therein, the ends of the lands of one of said set being aligned with the ends of the grooves of the other of said sets and in proximity to the ends of the lands in the other of said sets.

7. The clamp described in claim 6 wherein the lands of said sets at their facing ends form an angle of less than 180 degrees.

8. The clamp described in claim 7 wherein the tops of the lands of each of said sets describe a plane in the region of juxtaposition with the lands of the other of said sets.

9. The clamp described in claim 8 wherein the planes are substantially flat.

10. The clamp described in claims 7 or 8 wherein said angle is approximately 120 degrees.

* * * * *